J. W. BRYCE.
RECORDER.
APPLICATION FILED APR. 10, 1907.

1,116,872.

Patented Nov. 10, 1914.
4 SHEETS—SHEET 1.

WITNESSES:
John O. Gimper.
E. Martin

INVENTOR
James W. Bryce,
BY
Kenyon & Kenyon,
his ATTORNEYS

J. W. BRYCE.
RECORDER.
APPLICATION FILED APR. 10, 1907.

1,116,872.

Patented Nov. 10, 1914.
4 SHEETS—SHEET 2.

WITNESSES:
John O. Gempler
E. Martin.

INVENTOR
James W. Bryce,
BY
Kenyon & Kenyon,
his ATTORNEYS

J. W. BRYCE.
RECORDER.
APPLICATION FILED APR. 10, 1907.

1,116,872.

Patented Nov. 10, 1914.
4 SHEETS—SHEET 3.

WITNESSES:
John O. Gempler
E. Martin

INVENTOR
James W. Bryce
BY
Kenyon & Kenyon
his ATTORNEYS

J. W. BRYCE.
RECORDER.
APPLICATION FILED APR. 10, 1907.

1,116,872.

Patented Nov. 10, 1914.

WITNESSES:
John O. Gempler.
E. Martin.

INVENTOR
James W. Bryce,
BY
Kenyon & Kenyon,
his ATTORNEYS

UNITED STATES PATENT OFFICE.

JAMES W. BRYCE, OF BROOKLYN, NEW YORK, ASSIGNOR, BY MESNE ASSIGNMENTS, TO THE INTERNATIONAL TIME RECORDING COMPANY OF NEW YORK, A CORPORATION OF NEW YORK.

RECORDER.

1,116,872.

Specification of Letters Patent. Patented Nov. 10, 1914.

Application filed April 10, 1907. Serial No. 367,413.

*To all whom it may concern:*

Be it known that I, JAMES W. BRYCE, a citizen of the United States, and a resident of Brooklyn, in the county of Kings and State of New York, have invented certain new and useful Improvements in Recorders, of which the following is a specification.

My invention relates to recorders. It is of especial value in connection with machines for registering or recording or aiding in the registering or recording of, the data of the operation of a machine and the difference in data between two different operations of a machine, as for example the time of the operation of a machine and the elapsed time between two different operations of the machine.

My invention has for its object to provide apparatus by which an operator can easily, accurately and with certainty set up means for identifying the data representing an operation of the machine, as for example the time of a second or finishing operation, or means for identifying the data representing the difference between two operations of the machine, as for example the elapsed time between the beginning and the ending of work on a job, which identification means can be used later to actuate suitable mechanism to present in any suitable way an indication of the said operation or the data representing the difference between two operations, as for example by printing such an indication; also to provide new and improved identification means representing not only the first or in operation but also a second or out-operation of the machine; also to provide a new and improved card provided with an identification mark representing the data of a second or out-operation of the machine either alone or in connection with a mark of identification representing the in or first operation of the machine; also to provide a card provided with such identification mark or marks representing the data of such operation or operations of the machine expressed in units of linear measurement; also to arrange the devices for making identification marks upon a card representing the data of two different operations of the machine in different alinements or to arrange the identification devices for indicating the data of two different operations in different alinements; also to provide means for causing the devices for placing upon a card identification marks representing the data of two different operations of the machine and the card to be brought into different positions relatively to each other to produce a different alinement of the different identification marks; also to accomplish the different results and secure the advantages set forth in greater detail in the following part of this specification.

My invention consists in the novel devices and combinations herein shown and described.

In the machine illustrated in the drawings accompanying this specification and forming part hereof I have shown my invention as embodied in an apparatus for indicating elapsed time or for placing upon a card identification marks representing the time of the first and second operations of the machine and the elapsed time between such two operations but my invention is not limited to use in a machine indicating time, as it may be used in machines which set up identification devices or which make identification marks upon a card which represent other data than that of time.

In the embodiment of my invention shown and described herein the indications are expressed in units of linear measurement and not in printed words or characters. The identification devices, in the form shown the card with the time identification holes punched in it, are adapted to coöperate with and actuate another machine of suitable construction for translating such units of linear measurement into indications of words or figures; as, for example, printed words and figures.

In the form of my invention shown herein the identification devices are shown as time identification marks on a card and in the form shown are holes punched in the card, one hole representing the hour and another the minute of the starting time or the time of the first operation of the machine and another hole representing the hour and another the minute of the finishing time or the time of the second operation of the machine. But my invention is not limited to such identification devices as other devices than marks on a card may be used if desired. Such devices may be of any suitable form or construction and need not be a separable device such as a card capable of being removed from the machine but may be devices forming part of the machine itself and not removable therefrom.

The identification marks on the card are shown as holes punched in it. They are not, however, limited to holes but may be of any form and may be applied to the card in any way and if desired may be something added to rather than anything subtracted from the card, such as a hole or cut or may be something movable on the card. The term "card" is used in a broad sense of including any removable device whatever be its form or whatever material it is composed of, which is capable of receiving identification marks and of subsequently actuating suitable selecting or identifying devices for giving the indication represented by such identification marks.

In the drawings accompanying this specification and forming part hereof I have shown the preferred form of my invention and will now proceed to describe the embodiment thus shown in the drawing.

Referring to these drawings

Figure 7:
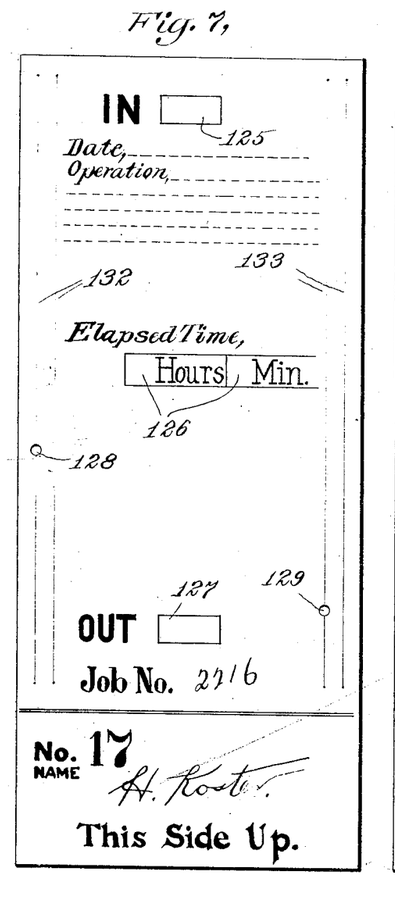
Fig. 7 is a face view of a card after it has been inserted into the slot in the "in" operation of the machine and the machine has been operated.

Before proceeding to describe the machine in detail I will first briefly describe the machine as operated by a workman in the in and out operations and the results accomplished by such operations. The machine as shown is for the purpose of placing upon a card marks which identify the hour and minute of the first or "in" operation of the machine and later which place upon the card marks identifying the hour and minute of the second or "out" operation. For example Fig. 7 represents the card after the first operation of the machine. In this operation two holes have been punched in the card, hole 128 representing the hour of the "in" operation and hole 129 representing the minute of the "in" operation. These are placed upon the card as follows. The workman inserts his card in slot 10 first having thrown the in and out lever 3 to its in position as indicated in dotted lines in Fig. 6. The movement of this lever causes two card guides 64 and 65 (see Fig. 3) to be thrown to the right. In this position the card when inserted will have the left one of the two parallel lines 132 in line with the hour punch 47 and the left of the two parallel lines 133 on the card in line with the minute punch 47ª. The card is pushed back in slot 10 until it rests against a back stop or abutment 139. This together with the guides 64 and 65 cause the card to register exactly with the indicating mechanism.

After the card is properly placed the workman reciprocates handle 9. This operates the various parts of the mechanism. Among other things it moves a carriage 52, by means presently to be described, back and forth on rods 13 and 14. This carriage is detachably connected with the punches 47, 47ª, and moves them each over the card along the left-hand line 132 and 133 respectively until each punch is stopped and detached from the carriage 52 by a trip striking a pin 33 on hour pin cylinder 31 or pin 34 on minute pin cylinder 32 in the line of travel of the punch trips. The pins thus acting as stops represent the hour and minute of the time of this first or "in" operation of the machine. Preferably they are so positioned on the cylinder that the travel of the hour and minute punch along the left hand lines 132 and 133 respectively represent in length the time between zero and the hour and minute respectively of the starting time or the time of the "in" operation of the machine. When the punches are thus disconnected from the carriage they are locked in the positions to which they have been moved, while the carriage meanwhile continues its onward movement. At the close of this forward movement of the carriage the punches 47 and 47ª are forced downward by oval bars 21 and 22, operated through the movement of the handle 9, and are caused to punch holes in the card representing the hour and minute at the starting time. These holes are shown as 128 and 129 in Fig. 7. The workman then withdraws his card.

Figure 8:
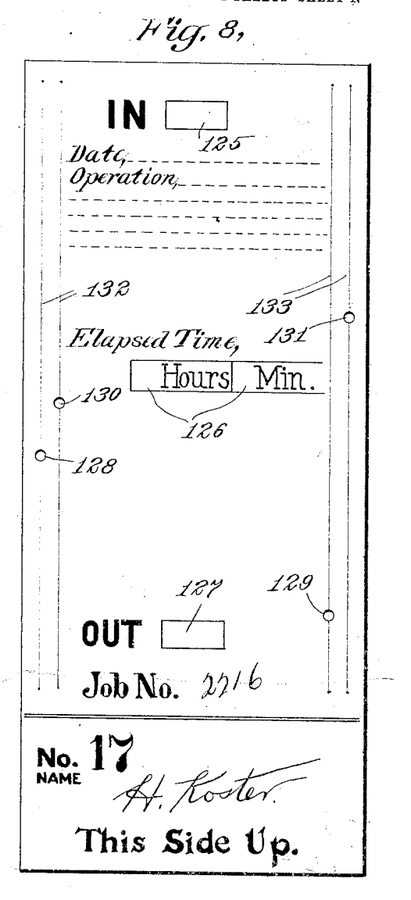
Fig. 8 is a similar view of the same card after it has been inserted again in the slot in a second or out operation of the machine.

At the close of the particular job a record of which is being made upon the card the workman again inserts the same card in slot 10 after having thrown lever 3 to the left or the "out" position. The throwing of this lever throws card guides 64 and 65 to the left as viewed in Fig. 3 bringing the right-hand line 132 and 133 into alinement with punches 47, 47ª respectively. After the card has been pushed in against stop 139 the workman gives lever 9 a complete reciprocation as before. In the same manner as already described this moves carriage 52 backward and forward. On its forward movement it carries the punches until they are stopped and detached from the carriage by lever 56 being tripped by the pin 33 and 34 of the hour and minute pin cylinders in line with the tripping levers 56. In the same way the punches are again locked and later are forced downward to punch in the card the holes representing the hour and minute of the second or "out" position of the machine. These are shown as hole 130 (Fig. 8) representing the hour and hole 131 representing the minute. In the further movement of the parts the carriage returns to its original position taking back with it the punches and their connections. The workman then withdraws his card which presents the appearance as shown in Fig. 8, having two holes, 128 and 130, on different lines, one representing the hour of the first operation and the other the hour of the second operation and 129 and 131 representing the minute of the first operation and the other the minute of the second operation of the machine. The linear distance between 128 and 130, as measured from the back toward the front of the card along one of the parallel lines 132 represents the elapsed time in hours between the two operations and similarly the linear distance along one of the lines 133 between hole 131 and 129 represents the elapsed time in minutes. If desired this distance can be measured and the elapsed time obtained in that way. In practice, however, I prefer to have such computation done automatically and for this purpose I have devised another machine so arranged and adapted that a card which has been treated or acted upon by the machine and described herein, such for instance as the card of Fig. 8, can be inserted into such other machine and by the operation of the same the elapsed time will be automatically computed and will be printed in the spaces 126 left blank in Fig. 8 before the words "Hours" and "Min."; in such machine also the "in" time will be automatically computed and printed in the space 125 after the word "In" at the top of Fig. 8 and the "out" time will be automatically computed and printed in the blank space 127 appearing after the word "Out" at the bottom of the card of Fig. 8. Such a machine however forms no part of the present invention and is therefore not shown and described herein. Of course any other machine suitable for that purpose could be employed. I have shown the devices for punching the holes in the card and the holes in the card themselves as so located and arranged as to be particularly adapted for the machine which I have devised for the purpose which I referred to above, but, of course, it will be understood that the identification marks on the card can be located and arranged in any other suitable way and so as to coöperate with any other suitable computing and printing machine. The machine devised by me referred to above is shown and described in an application of mine executed simultaneously herewith.

I will now proceed to describe more in detail the particular devices shown in the drawings herein.

1 represents the clock face and clock movement of my improved device and 2 the shaft for transmitting motion therefrom to the pin cylinders 32 and 31.

3 is the in and out lever and 4 the handle thereof.

9 is the operating handle fast on the main driving shaft 80.

10 is the card slot. When a card is inserted into this slot it rests on the card receiver bottom 23.

24 is the card receiver top. 64 and 65 form the sides of the slot and act as guides to bring the card into proper alinement with the punches 47 and 47ª. These card guides are movable sidewise. As shown they are so arranged that the cards, such as are shown in Figs. 7 and 8 will just fit in between them. A back stop or card abutment is shown at 139 against which the inner end of the card is pressed when inserted by the workman. It is of course important that the card be always inserted its full distance until it rests against the stop 139 as in this way accurate register lineally from the back of the card is obtained for the location of the various holes punched in the card. This stop together with the card guides 64 and 65 enable the card to be always accurately registered with reference to the punching devices and their time controlling stops. In order to adapt the card when operated upon in this machine for use in the machine described in my said other application I preferably arrange it so that the "in" and "out" hour and minute holes will be punched in the card upon different lines. This feature is not essential to the broad invention of the present application, as the hour holes and similarly the minute holes might be punched upon the same line if desired or if the card were intended to be used with a computing and printing machine so arranged that it could compute the elapsed time where the holes were punched in the same line. In the present case I secure the different alinement of the hour holes from each other and of the minute holes from each other by making the card guides 64 and 65 movable sidewise. The devices for doing this are shown in Figs. 1, 2, 3 and 6.

Figures 1, 6, 9:
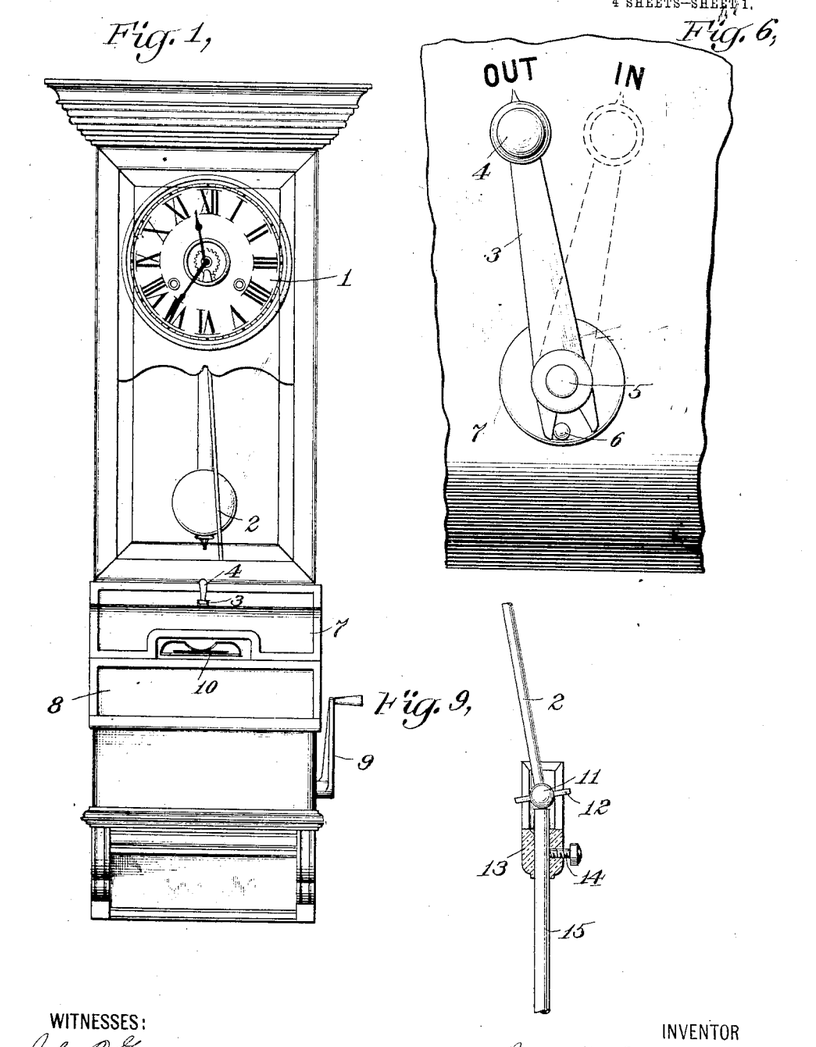
Figure 1 is a face view of such a preferred form of my improvement.
Fig. 6 is a detail of the "in" and "out" lever.
Fig. 9 is a detail view of the universal joint connection on the shaft which connects the recorder with the clock movement.

3 is an out lever with a handle 4 with an arrow indicating point. The words "Out" and "In" are marked upon the casing as shown in Fig. 6. When the knob 4 is moved so as to bring the arrow pointing to the word "Out" the guides 64 and 65 are moved to the left bringing the right-hand line 132 and 133 on the card in line with the punches 47 and 47ᵃ and when the knob is thrown with the arrow pointing to the word "In" the left-hand lines 132 and 133 are brought into such alinement.

The connecting mechanism consists of the following: Lever 3 is pivoted to stud 5 in the upper casting 7. 6 is a stop-pin to prevent overthrow of lever 3. Stud 5 has a square recess drilled in its lower end (Fig. 2) in which is secured the upper squared end of stud-shaft 16 freely mounted in casting 119 secured to the framework 53 of the machine. A bell-crank 135 is secured to the lower end of shaft 16. A hole in the end of 135 loosely encircles pin 134 secured to and projecting upward from card receiver 24. The top 24 of the receiver is rigidly secured to the guides 64 and 65. To secure a perfectly parallel sidewise motion to the card receiver another stud-shaft 20 is mounted in a casting 120 secured to the framework 30 at the opposite end of the machine. This shaft 20 carries a crank-shaft 137 on its lower end which fits loosely over the stud 136 on the card receiver exactly as already described for the lever 135. To connect these levers a link 18 is provided secured to two short crank arms 19 and 17, fastened to the stud shafts 20 and 16 respectively. The crank arms 19 and 17 are at right angles to the crank arms 137 and 135. By the above means the movement of handle 3 moves the card receiver bodily sidewise into the "in" or "out" position.

Figure 2:
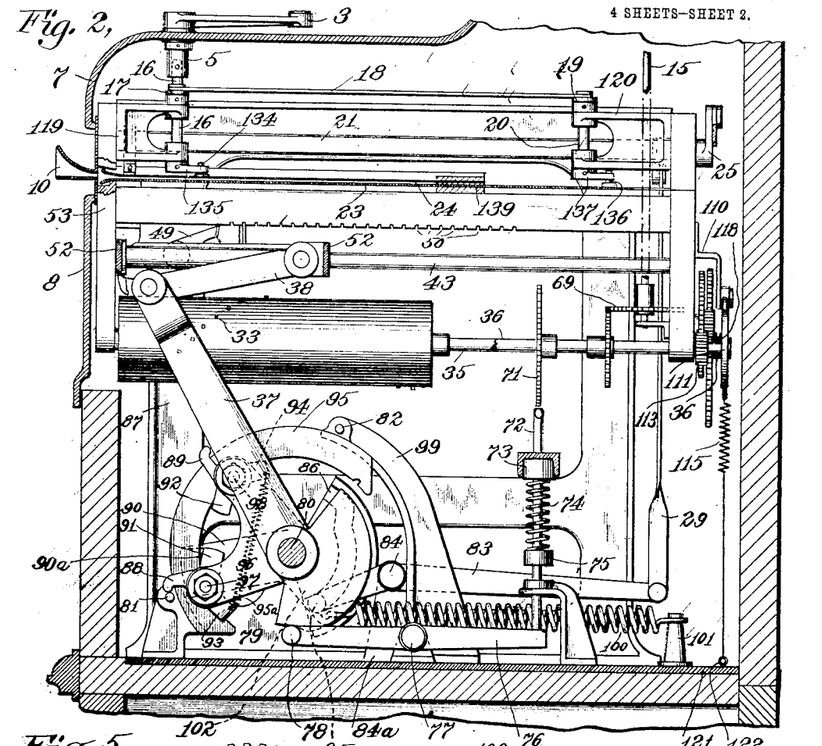
Fig. 2 is a cross-section taken through the card receiver slot.

*The carriage, and its connections.*—52 is the carriage. It is adapted to reciprocate on two guide rods 43 and 44, secured in the casings 30 and 52. Along these rods carriage 52 is moved back and forward with each reciprocation of handle 9. Any suitable means may be provided for giving it this reciprocating movement. I preferably provide means that will cause the carriage to be moved only a part of the reciprocating movement of the main shaft in each direction. As shown this is accomplished by the following mechanism: A complete movement of handle 9 reciprocates shaft 80. Fast on this shaft is an arm 90; loosely mounted on shaft 80 is a plate 96. Secured to this plate is arm 37 and connecting the upper end of arm 37 is a link 38. On plate 96 are mounted pawls 88 and 89 pivoted at 97 and 98 respectively. Each pawl is provided with a tail that of 88 being numbered 91 and that of 89 being numbered 92. Arm 90 has an overhang portion 90ᵃ at its other end. Pawl 88 has also a tail 93 and pawl 89 a tail 94. In the position of the parts shown in Fig. 2, overhang 90ᵃ is outside of the tail 91 of pawl 88, but is in line with the tail 92 of pawl 89. As shaft 80 rotates arm 90 moves overhang 90ᵃ until the latter strikes tail 92, rotating plate 96 on shaft 80. At the moment the overhang engages tail 92 the rear end of the overhang clears tail 91 of pawl 88. As plate 96 rotates, pawl 88 moves away from pin 81 mounted on the frame work close to sector 95, secured to the framework, and tail 93 is forced out of a notch in sector 95 by spring 95ᵃ and moves along the inner side of sector 95. This rotates pawl 88 and its tail 91 slightly, bringing the latter immediately behind overhang 90ᵃ. This securely locks together arm 90 and overhang 90ᵃ with plate 96. The parts continue to rotate until the nose of pawl 89 strikes pin 82 on bracket 99 secured to the framework, slightly rotating pawl 89 on its pivot withdrawing tail 92 from in front of overhang 90ᵃ and throwing the point of tail 94 into the notch at the right hand end of sector 95 as shown in Fig. 2. This stops the movement of plate 96 and with it the backward movement of the carriage and locks these parts securely in place. It also permits the continued rotation of shaft 80 for a limited distance. This shaft rotates a slight distance farther, is then stopped and is returned by the return movement of handle 9. On this return movement the other end of overhang 90ᵃ engages tail 91 of pawl 88 and moves plate 96 and its connecting parts, including the carriage back to their original positions, tail 94 of pawl 89 being moved out of its notch and tail 92 being thrown in directly behind the end of overhang 90ᵃ, thus locking the parts together again during their return movement. The nose of pawl 88 strikes pin 81, pawl 88 is slightly rotated throwing tail 91 to the right out of the path of overhang 90ᵃ and throwing tail 93 into engagement with its notch in sector 95, thus locking plate 96 and its connecting parts in their original positions. Arm 90 continues its return movement a slight distance farther as shown in Fig. 2. By these means a reciprocating movement is given to the carriage, the carriage is locked with the driving means during both the backward and forward movements, is disengaged therefrom at the end of the backward movement, and is there locked in position.

Figures 3, 4:
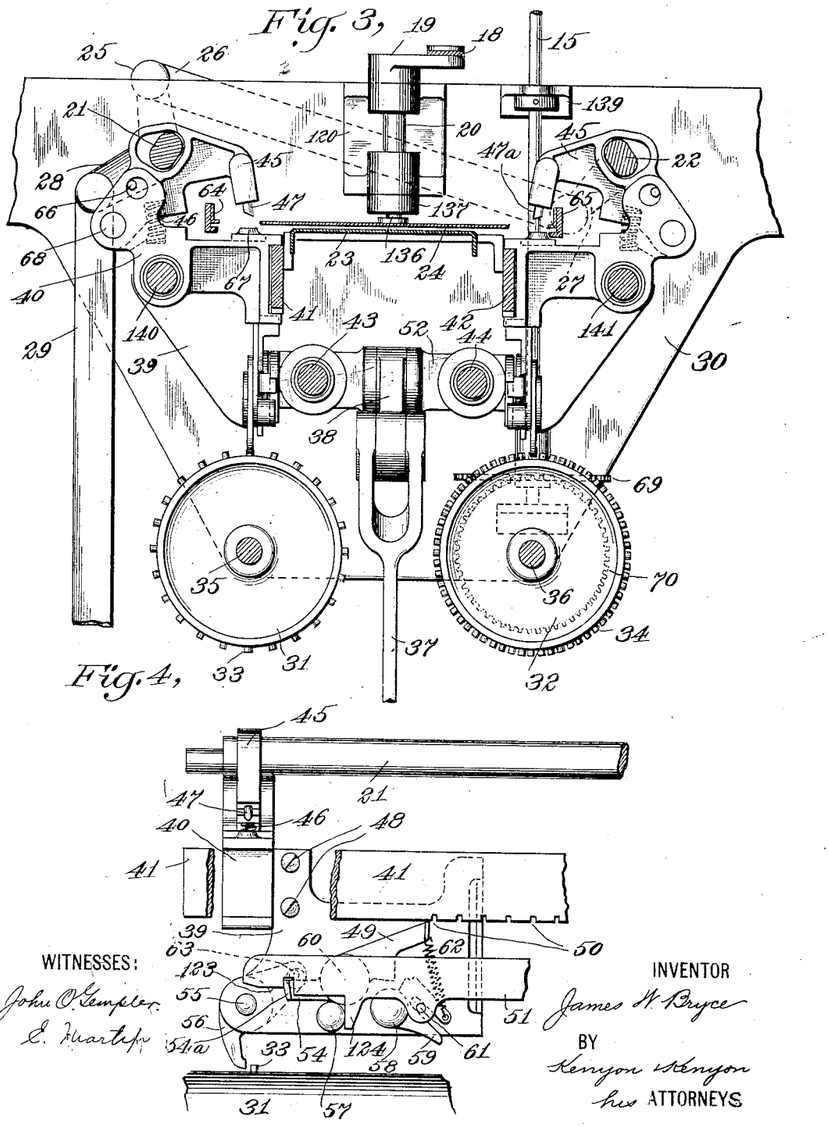
Fig. 3 is an enlarged end view of the punches and their actuating mechanism showing also the time stop cylinders which are used to limit the movement of the punches in accordance with the time of day.
Fig. 4 is a side view of the hour punch and its connections.

*The punches, and their operating mechanism.*—In the form of machine shown in the drawings the identification devices are shown as punches for punching time identification marks on a card. Two punches are shown, an hour punch 47, and a minute punch 47ᵃ. Of course one or any number of punches could be employed as desired. The hour punch and its connections are shown at the left in Fig. 3, and the minute punch and its connections are shown at the right of the same figure. As the construction of the two punches and their connecting parts are substantially identical, particular attention will be given to a description of the hour punch and its connections. Both punches stand normally at a given fixed position in the machine, and they are adapted to be moved by the carriage in its backward and forward movements to a greater or less extent dependent upon the hour or minute of the particular operation of the machine. In this movement the extent of movement of each punch is determined by a series of time stops controlled by the time movement. The time stops for the hour mechanism are shown as pins 33 on a pin cylinder 31 and those for the minute are shown as pins 34 on a pin cylinder 32. The location of a pin of one of these cylinders in the path of a part of the punch connecting mechanism determines the extent of movement of the punch as will be presently described. In order to permit this operation, each punch is detachably connected with the carriage. The mechanism shown for this purpose is as follows: The hour mechanism is composed of a body portion 40 mounted and free to slide on rod 140. The minute punch is similarly constructed and slides on rod 141. Body portion 40 has hinged to it at 38, an upper portion 45 carrying at its outer end the punch proper 47 in alinement with the die portion 67 located beneath it on body portion 40. A spring 46 tends to throw upper portion 45 upward, this upward movement being limited by a pin 66 from upper portion 45 engaging the upper part of an opening in the upper part of body portion 40 as shown in Fig. 3. Through an irregular opening in upper portion 45 projects an oval rod 21 mounted in bearings in the front and back frames 30 and 53. This rod is for the purpose of operating the punch, as will be presently described. A similar oval rod 22 is provided for the minute punch. To prevent overturning of the punch the body portion 40 has two lips which extend one over and one below a locking bar 41 secured to the front and back frames 53 and 30. A similar locking bar 42 is provided for the minute punch. It will be understood, of course, that the body and upper portion of each punch move together along the rod 140 or 141 and along each bar 41 or 42 and oval rod 21 or 22.

The detachable connections between the carriage and the hour punch are shown particularly in Fig. 4. The carriage has on each side a draw-bar 51. Secured to the body portion 40 of each punch is a steel apron 39 secured to it by screws 48. Pivoted to apron 39 at 55 is a bell-crank lever 56 provided at its upper end with a pin 63. Pin 63 normally rests upon the top of tail 54 of a locking pawl 49 pivoted at 60 to the apron. In the normal position of the parts a side projection 54ª from tail 54 rests in a notch cut in the rear end of draw-bar 51 as shown in Fig. 4, and as the carriage moves along draw-bar 51 through its notch and the projection 54ª on pawl 49 also draws with it the punch and its connecting parts. The punch is drawn along over the card a distance representing the time from the zero or starting point of time to the time of day when the machine is operated. When it reaches that point the punch is disconnected from the carriage by means of time stops situated on a time-driven cylinder. In the form shown the time stops for the hour mechanism consist of pins 33 on a pin cylinder 31 and those for the minute punch consist of pins 34 on a pin cylinder 32. Both of these pin cylinders are driven by the clock movement, as will be presently described. In the form shown the pin cylinder 31 is provided with 24 pins arranged spirally as shown in Fig. 2 and pin cylinder 32 is provided with 60 pins arranged in a similar spiral manner. This spiral arrangement is for the purpose of bringing upon the line of travel of a tripping pawl 56 the particular pin representing the hour or minute of the operation of the machine. It will be evident that the spiral arrangement brings only one pin at a time in the path of travel of pawl 56 and that the longitudinal location of said pin is dependent upon the hour or minute of the operation of the machine.

When pawl 56 strikes a pin 33, pin 63 forces tail 54 downward disengaging projection 54ª from the notch in draw-bar 51. The punch immediately stops and the carriage and draw-bar 51 proceed on their course. The same movement of pawl 49 throws its upward end into one of the notches 50 of locking-bar 41, thus locking the punch in set position. 49 is temporarily held in notch 50 by the under surface of the rear of draw-bar 51 pressing on the upper part of projection 54ª. As soon as the rear end of draw-bar 51 clears 54ª, pawl 49 would be drawn out of notch 50. In order to avoid this I provide a second lock to hold pawl 49 in its locking position. As shown this consists of a second locking piece 59 pivoted at 58 and provided at its upper end with a V-shaped notch to take under a sharp projection of corresponding shape in pawl 49. A pin 61 extending sidewise from draw-bar and engaging in a slot in locking piece 59 rotates the latter as draw-bar 51 parts from the punch and its connections throwing locking piece 59 to the left and up as shown in Fig. 4 and locking 49 in position. Spring 62 connecting the end of pawl 49 and the upper arm of locking piece 59 tends to pull the two toward each other. On the return of draw-bar 51 pin 61 enters the slot and tilts locking piece 59 to the right and downward releasing locking pawl 49 whereupon spring 62 draws it from out of notch 50 unlocking the punch.

In the further return movement of draw-bar 51 a projection 124 engages with a projecting pin 57 from the side of apron 39 and forces the apron and punch and connections back to their original positions.

It will be understood that the same devices are used for the minute punch and its connections.

After the punches have been moved into set position and locked there they are at the appropriate time operated by the following described mechanism. 21 and 22 are two oval shaped rods mounted in bearings in the front and back frames 53 and 30. Each one passes through an irregular shaped opening, shown in Fig. 3, in the upper part 45 of its punch. Each rod and its opening are preferably so shaped and proportioned that the punch will not touch the rod as the punch is reciprocated. This permits free movement of the punches. The parts are so shaped and proportioned, however, that when the rod is rotated on its axis upper part 45 will be forced downward and punch 47 be caused to pass through the card and punch a hole therein. These oval bars 21 and 22 are operated from the main shaft 80 by means of cam 86, a roller 85 operating in a cam groove in the cam, roller 85 being secured to the end of bell-crank lever 83 pivoted at 84 on a support 84ᵃ thrown up from the base of the machine. The other end of lever 83 (Fig. 2) is pivotally connected with link 29. This link at its upper end is connected to crank-arm 28 fast on oval rod 21. Also fast on oval rod 21 is an arm 25 pivoted at its upper end to link 26. The latter is pivoted at its farther end to an arm 27 fast on oval rod 22. At the proper time cam 86 and its connections force link 29 upward rocking both oval rods 21 and 22 and forcing the punches through the card.

It will be apparent from the above that the location of any hole punched upon the card either for the "in" or the "out" operation will represent the time of such operation either in hours or minutes and the distance from the hole, representing either the hour or the minute of the "in" to the hole representing the corresponding time of the "out" operation, as for example the distance between 128 and 130, as measured on either of the parallel lines shown in Fig. 8, will represent in linear measurement the elapsed time between the "in" and "out" operation. As shown in Fig. 8 this linear distance along either line 132 between the location of hole 128 and that of 130 represents the difference in hours between the two operations of the machine and the distance between hole 129 and 131 on either line 133 represents the difference in minutes between the two operations. It will be understood, of course, that in the arrangement of parts of the particular machine and card shown in the drawings herein, the actual distance on the card between an "in" hole and the corresponding "out" hole may not always represent in linear units of measurements, the elapsed time. For example, if the "out" hole is located nearer the zero or starting point on the card than is the "in" hole, the distance representing the elapsed time, includes the distance from the "in" hole to the upper end of the card, as shown in Fig. 8, and also the distance from the zero or starting point on the card to the "out" hole. It is when this situation exists with reference to the minute holes, that one must be subtracted from the hours of elapsed time. This distance can be computed in actual hours and minutes by measuring the distance with a rule or in any other suitable way. In practice I prefer to compute it automatically by means of another machine which I have devised and which forms the subject of another application for patent executed and filed simultaneously with this application.

In order to adapt the card of this application for use in my said computing machine of my other application I have shown the "in" and "out" hour identification holes on the card as made upon different lines on the card and have followed the same arrangement with the minute identification holes. It is not essential, however, for the present invention that this should be done, as any suitable alinement can be employed as desired.

The pin cylinders can be driven in any suitable manner. As shown, the mechanism for this purpose is as follows: 2 is a shaft connecting with the clock movement and adapted to be driven thereby. This is connected to driving shaft 15 by a universal joint shown in Fig. 9. As there shown it is made of the usual form consisting of a brass sleeve 13 secured to shaft 15 by set-screw 14. Into the upper end of this sleeve is inserted the ball 11 formed on the end of shaft 2 and having driven through it a pin 12 engaging with a slot in the upper end of brass sleeve 13. Shaft 15 carries at its lower end a gear 69 meshing with a gear 70 on shaft 36 of pin cylinder 32. Shaft 36 is rotated once an hour.

Figure 5:
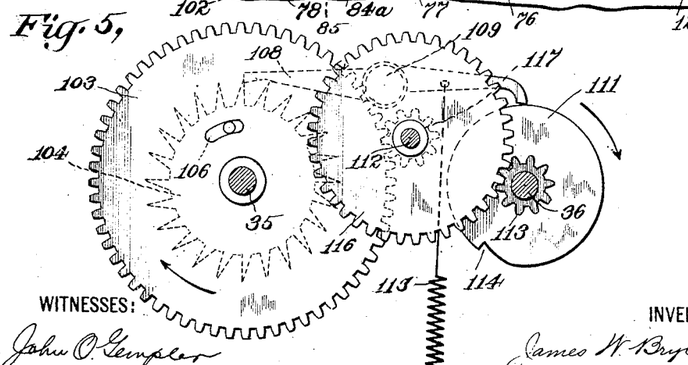
Fig. 5 is a detail view of the hour transfer mechanism.

The hour pin cylinder 31 is driven from shaft 36 by the following described connections: 113 is a pinion fast on shaft 36 (see Figs. 2 and 5) and meshing with a large gear 116 mounted on stud-shaft 112. Fast on this stud-shaft is a pinion 117 which meshes with a large gear 103. This gear has a slot 106 cut in it into which projects a pin 105 fast on toothed wheel 104. This latter wheel is provided with 24 teeth and is fast on shaft 35 of the hour pin cylinder 31 and drives that pin cylinder. Gears 113, 116, 117, 103 are so proportioned that gear 103 moves one twenty-fourth of a revolution for each complete revolution of shaft 36, or, in other words, moves one tooth each hour. Gear 103 and toothed wheel 104 are connected by a spiral spring 118. 108 is a lever fulcrumed at 109 on a bracket 110 mounted on the back frame of the machine. One end of the lever 108 is adapted to engage with the toothed wheel 104 and the other end of lever 108 is held against the rim of disk 111 by tension spring 115. 114 is a notch cut in disk 111. Disk 111 is fast on shaft 36 and of course rotates once each hour. When the end of lever 108 is opposite notch 114 the other end of lever 108 is moved out of engagement with the tooth of wheel 104. That is so timed that gear 103 had moved forward so that pin 105 was at the time at the rear of slot 106. Spiral spring 118 immediately causes wheel 104 to jump forward, when thus freed from lever 108, until pin 105 strikes the other end of slot 106 when its movement is arrested. This distance is equal to one tooth of wheel 104 and one pin of cylinder 31. In this way pin cylinder 31 is moved forward one point at the end of each hour.

I preferably lock the clock movement during the operation of the machine. This is accomplished as follows: After shaft 80 begins to rotate but before the carriage begins its movement a cam 79 fast on shaft 80 forces outward a roller 78 on the end of lever 76, pivoted at 77 on a lug secured to the base-plate of the machine. Resting upon the other end of lever 76 is the lower end of finder-rod 72. This rod is guided in casting 73 fastened to both of the side frames of the machine, and is also guided in casting 138 secured to the base-plate. A collar 75 is fastened to rod 72 and has resting upon its upper surface spiral compression spring 74 which presses against the lower side of casting 73. This normally keeps finder rod 72 in its downward position and keeps its upper beveled end normally out of contact with finder wheel 71 which is fast on minute-shaft 36. Cam 79 is so shaped that the first movement of shaft 80 causes the finder rod to enter one of the 60 spaces between the teeth of the finder wheel and thus accurately alines this wheel and locks the connecting mechanism. A spring 100 secured at one end to stud 101 of the frame-work and at the other end to the lower part of an arm 102 fast on shaft 80 returns that shaft and its connecting parts to their original positions after the operator has let go of handle 9, in case he does not return the handle to its original position.

Many changes or modifications in or omissions from or additions to, the devices shown in the drawings herein may, of course, be made without departing from my invention.

What I claim as new, and desire to secure by Letters Patent, is:—

1. In a time recording machine the combination of a finishing-time marking device, means for moving it over a card, a clock mechanism, and a stop-device, controlled by the clock mechanism, for limiting such movement in accordance with the time of a second or finishing operation of the machine, whereby an identification time mark, representing the time of the said second or finishing operation, will be made upon the card.

2. In a time recording machine the combination of a finishing-time marking device, means for moving it over a card, a clock mechanism, and time stops controlled by the clock mechanism for limiting such movement in accordance with the time of a second or finishing operation of the machine, whereby an identification time mark, representing the time of the said second or finishing operation, will be made upon the card.

3. In a time recording machine the combination of a punch, means for moving it over a card, a clock mechanism, and a stop-device, controlled by the clock mechanism for limiting such movement in accordance with the time of a second or finishing operation of the machine, whereby the punch will punch in the card an identification time hole representing the time of the second or "out" operation of the machine.

4. In a time recording machine the combination of a punch, means for moving it over a card, a clock mechanism, and time stops controlled by the clock mechanism for limiting such movement in accordance with the time of a second or finishing operation of the machine, whereby the punch will punch in the card an identification time hole representing the time of the second or "out" operation of the machine.

5. In a time recording machine the combination of an hour punch, means for moving it over a card, a clock mechanism, and a series of time stops representing hours and controlled by the clock mechanism for limiting such movement in accordance with the hour of a second or finishing operation of the machine, whereby the punch will punch in the card an identification hole representing the hour of the second or "out" operation of the machine.

6. In a time recording machine the combination of a minute punch, means for moving it over a card, a clock mechanism, and a series of time stops representing minutes and controlled by the clock mechanism for limiting such movement in accordance with the minute of a second or finishing operation of the machine, whereby the punch will punch in the card an identification hole representing the minute of the second or "out" operation of the machine.

7. In a time recording machine the combination of a starting-time and finishing-time marking device, means for moving said device over a card, a clock mechanism, and a stop-device, controlled by the clock mechanism, for limiting the movement of such device over the card in accordance with the time of each operation of the machine, whereby identification time marks will be placed upon the card, one representing the time of the first and the other of the second operation of the machine.

8. In a time recording machine the combination of a starting-time and finishing-time marking device, means for moving said device over a card, a clock mechanism, a set of time stops, controlled by the clock mechanism, for limiting the movement of such device over the card in accordance with the time of each operation of the machine, whereby identification time marks will be placed upon the card, one representing the time of the first and the other the time of the second operation of the machine.

9. In a time recording machine the combination of a punch, means for moving it over a card at each operation of the machine, a clock mechanism, a series of time stops controlled by clock mechanism, adapted to limit the movement of the punch, in accordance with the time of each operation of the machine, whereby holes may be punched in the card, one representing the time of the first or "in" operation of the machine and the other the time of the second or "out" operation of the machine.

10. In a time recording machine the combination of two punches, an hour punch and a minute punch, means for moving the punches over a card, a clock mechanism, two sets of time stops controlled by the clock mechanism, one representing the minutes and the other the hours, all so connected and arranged that the stops of each set will limit the movement of its corresponding punch in accordance with the hour or minute of each operation of the machine, whereby holes may be punched in the card, two representing the hour and minute respectively, of the first or "in" operation of the machine and two representing the hour and minute respectively of the second or "out" operation of the machine.

11. In a time recording machine the combination of two punches, an hour punch and a minute punch, means for moving the punches over a card at each operation of the machine, a clock mechanism, two sets of time stops controlled by the clock mechanism, each set consisting of a pin cylinder, one representing the hours, the other the minutes, whereby the movement of each punch over the card will be limited in extent by the position of the pins on its pin cylinder, and means for actuating the punches, whereby identification time holes may be punched in the card representing respectively the hour and minute of the first or "in" operation of the machine and the hour and minute of the second or "out" operation of the machine.

12. In a time recording machine the combination of a device for placing upon a card a time identification mark representing the time of the first or "in" operation of the machine adapted to affect the movement of suitable time recording mechanism, and for placing upon a card an identification mark representing the time of the second or "out" operation of the machine adapted to affect the movement of suitable time recording mechanism, and means for causing the said device to be in different operative alinements in respect to the card at the two different operations of the machine.

13. In a time recording machine the combination of a starting-time and a finishing-time marking device, means for moving said device over a card, a clock mechanism, a set of time stops for said device, controlled by the clock mechanism, for limiting its movement at each operation of the machine at one time in accordance with the time of the first or starting operation of the machine and at another in accordance with the time of a second or finishing operation of the machine, and means for shifting the marking device and card relatively to one another, whereby identification time marks may be placed upon the card, but upon different lines thereon, one mark representing the time of the first or "in" operation of the machine and the other the time of the second or "out" operation of the machine.

14. In a time recording machine the combination of a starting-time and a finishing-time marking device, means for moving said device over a card, a clock mechanism, a set of time stops for said device, controlled by the clock mechanism, for limiting its movement at each operation of the machine, at one time in accordance with the time of the first or starting operation of the machine and at another in accordance with the time of a second or finishing operation of the machine, and means for shifting the card relatively to the marking device, whereby time identification marks may be placed upon the card, but upon different lines thereon, one mark representing the time of the first or "in" operation of the machine and the other the time of the second or "out" operation of the machine.

15. In a time recording machine the combination of a starting-time and a finishing-time marking device, means for moving said device over a card, a clock mechanism, a set of time stops for said device, controlled by the clock mechanism, for limiting its movement at each operation of the machine, at one time in accordance with the time of the first or starting operation of a machine and at another in accordance with the time of a second or finishing operation of the machine, means for shifting the card relatively to the marking device, and means for causing the card and marking device to accurately register with one another in their different positions, whereby identification time marks may be placed upon the card, but upon different lines thereon, one mark representing the time of the first or "in" operation of the machine and the other the time of the second or "out" operation of the machine.

16. In a time recording machine the combination of a device for placing upon a card time identification marks adapted to affect the movement of suitable recording mechanism, manually controlled means for moving the device and card relatively to each other, a clock mechanism, a set of time stops, controlled by the clock mechanism, for limiting such movement in accordance with the time of the operation of the machine, and means for moving the device and card relatively to each other in another direction so as to cause the different identification time marks to be placed upon the card on different lines.

17. In a machine the combination of a device for placing upon a card identification marks adapted to affect the movement of suitable recording mechanism, manually controlled means for moving the device and card relatively to each other, a set of stops for limiting such movement in accordance with the operation of the machine, and means for moving the device and card relatively to each other in another direction so as to cause the different identification marks to be placed upon the card on different lines.

18. In a time recording machine the combination of two punches, means for moving them over a card, a clock mechanism, two sets of time stops, one for each punch, representing different sub-divisions of time and controlled by the clock mechanism and adapted to limit the movement of punches and to stop them at points along the card representing the times of the operation of the machine, and means for shifting the card relatively to the punches, whereby time identification marks representing the times of different operations of the machine may be placed upon the card upon different lines thereon.

19. In a time recording machine the combination of two punches, an hour punch and a minute punch, means for moving the punches over a card at each operation of the machine, a clock mechanism, two sets of time stops controlled by the clock mechanism, each set consisting of a pin cylinder, one representing the hours, the other the minutes, whereby the movement of each punch over the card will be limited in extent by the position of the pins on its pin cylinder, and means for actuating the punches, and means for shifting the card relatively to the punches, whereby identification time holes may be punched in the card representing respectively the hour and minute of the first or "in" operation of the machine and the hour and minute of the second or "out" operation of the machine, and whereby the holes representing the first or "in" operation will be upon different lines from those representing the second or "out" operation.

20. In a machine for placing upon a card identification marks adapted to affect the movement of suitable recording mechanism, the combination of a card receiver, a device for placing such marks on the card, manually controlled means for moving said device in a line over the card, time stops for limiting such movement in accordance with the time of operation of the machine, and manually controlled means for shifting the positions of the device and card relatively to each other, for different operations of the machine, whereby the different time marks placed by the device upon the card will be located along different lines upon said card.

21. In a time recording machine the combination of an hour punch, a minute punch, means for moving them over a card along parallel lines, a clock mechanism, a set of time stops for each punch controlled by the clock mechanism and adapted to limit the movement of said punch, one set representing the hours, the other the minutes, means for locking the punches in set position, means for operating the punches and means for shifting the relative position of the punches and card for different operations of the machine, whereby upon a second operation of the machine each punch will move across the card along a different line from that followed by it upon the first operation of the machine and the hour and minute identification holes in the card representing the hour and minute of the second operation will be made upon different lines from those made upon the first operation.

22. In a time recording machine the combination of a device for placing time identification marks upon a card, means for moving the device and card relatively to each other, a clock mechanism, and a stop-device, controlled by the clock mechanism, for limiting such movement in accordance with the time of the operation of the machine, and means for moving the device and card relatively to each other in another direction so as to cause the different identification time marks to be placed upon the card on different lines.

23. In a time recorder the combination of a card, a single time marking device adapted at each operation of the machine to make upon the card a mark representing the time of such operation, the card and marking device being normally positioned with reference to each other so as to represent the zero of time, clock-controlled means adapted at each operation of the machine to position the card and marking device relative to each other in accordance with the time of such operation of the machine, whereby the said time marking device will at each operation make upon the card a mark representing by its location thereon the time of such operation.

24. In a time recorder the combination of a device for receiving a time mark representing the time of an operation of the machine, a single time marking device adapted at each operation of the machine to make upon said device a mark representing the time of such operation, the receiving device and marking device being normally positioned with reference to each other so as to represent the zero of time and a clock-controlled means for positioning the said marking device and the other device relative to each other in accordance with the time of such operation of the machine, whereby the said marking device will at each operation make a mark upon the said time identification device representing by its location thereon the time of such operation.

25. The combination of a card, a device for punching holes in the card, manually operated means for moving the punching device across the card at each operation of the machine, and clock-controlled stops for limiting such movement in accordance with the time of operation, whereby the elapsed time between two operations by an operative will be indicated by the relative location upon the card of the two holes punched at the two operations.

26. The combination of a card, a device for punching holes in the card, manually operated means for moving the punching device and card relatively to each other at each operation of the machine, and clock-controlled stops for limiting such movement in accordance with the time of operation, whereby the elapsed time between two operations by an operative will be indicated by the relative location upon the card of the two holes punched at the two operations.

27. The combination of a card, a device for punching holes in the card, manually operated means for moving the punching device across the card at each operation of the machine, clock-controlled stops for limiting such movement in accordance with the time of operation, whereby the elapsed time between two operations by an operative will be indicated by the relative location upon the card of the two holes punched at the two operations, and manually-controlled means for moving the card and punching device relatively to each other in a direction at right angles to the line of the aforesaid movement of the punching device across the card so as to bring the holes representing the times of the two different operations in a different alinement upon the card.

In testimony whereof, I have signed my name to this specification, in the presence of two subscribing witnesses.

JAMES W. BRYCE.

Witnesses:
 EDWIN SEGER,
 JOHN O. GEMPLER.